US 6,687,410 B1

(12) United States Patent
Brown (10) Patent No.: US 6,687,410 B1
(45) Date of Patent: Feb. 3, 2004

(54) METHOD AND APPARATUS FOR COMPRESSION AND DECOMPRESSION OF DATA

(75) Inventor: Russell A. Brown, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/499,262

(22) Filed: Feb. 7, 2000

(51) Int. Cl.⁷ .................................................. G06K 9/36
(52) U.S. Cl. ........................................................ 382/239
(58) Field of Search ................................. 382/232, 236, 382/238–240, 242, 248, 250; 358/432, 433; 348/384.1, 394.1–395.1, 400.1–404.1, 407.1–416.1, 420.1, 421.1, 425.2, 430.1, 431.1; 375/240.02–240.03, 240.11–240.16, 240.18–240.2, 240.22–240.25; 341/51, 63, 65, 67, 79, 107; 708/203, 300, 307–308, 313, 316–317, 400–405

(56) References Cited

U.S. PATENT DOCUMENTS

| | | | |
|---|---|---|---|
| 4,809,067 A | | 2/1989 | Kenichi et al. |
| 4,984,076 A | * | 1/1991 | Watanabe et al. ............. 358/133 |
| 5,661,822 A | * | 8/1997 | Knowles et al. ............. 382/233 |
| 5,721,791 A | * | 2/1998 | Maeda et al. ................ 382/253 |
| 5,739,861 A | * | 4/1998 | Music ......................... 348/391 |
| 5,754,698 A | * | 5/1998 | Suzuki et al. ............... 382/232 |
| 5,847,766 A | | 12/1998 | Peak |
| 5,862,261 A | | 1/1999 | Lee |
| 6,014,181 A | * | 1/2000 | Sun ............................ 348/699 |
| 6,023,295 A | | 2/2000 | Pau |
| 6,031,937 A | * | 2/2000 | Graffagnino ................ 382/236 |
| 6,072,830 A | * | 6/2000 | Proctor et al. .............. 375/240 |
| 6,101,276 A | * | 8/2000 | Adiletta et al. ............. 382/236 |
| 6,233,017 B1 | * | 5/2001 | Chaddha ..................... 348/412 |
| 6,275,620 B2 | * | 8/2001 | de Queiroz et al. ........ 382/270 |
| 6,281,942 B1 | * | 8/2001 | Wang ......................... 348/607 |
| 6,337,881 B1 | * | 1/2002 | Chaddha ................. 375/240.16 |

FOREIGN PATENT DOCUMENTS

WO    WO 93 14600    7/1993

OTHER PUBLICATIONS

IBM Technical Disclosure Bulletin, IBM Corp., New York, vol. 34 No. 1, Jun., 1999 (Jun. 1991), pp. 289–291, XP000210220, ISSN: 0018–8689 p. 291, line 5–last line.

* cited by examiner

Primary Examiner—Jose L. Couso (57) ABSTRACT

The present invention is a compression scheme for compressing audio and video data. An image is divided into blocks of pixels. In one test, if all of the pixels are approximately equal to the corresponding pixels in the previous block, then no data is sent for that block. In a second test, if all of the pixels in a block are approximately equal to a mean pixel value, then only one color value is transmitted. In a third test, if quantization of the pixels via companding results in an acceptable representation, the quantization is performed. The present invention uses quantization codes that are proportional to the logarithm of the magnitude of the range quantized, computation of a magnitude byte that permits rapid discovery of the number of bits used for quantization of a block, recursive packing and unpacking of quantized pixel data, and two-dimensional paths through the block.

14 Claims, 7 Drawing Sheets

METHOD AND APPARATUS FOR COMPRESSION AND DECOMPRESSION OF DATA

BACKGROUND

1. Field of the Invention

This invention relates to the field of data compression.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, and MAJC, are trademarks or registered trademarks of Sun Microsystems, Inc. in the United States and other countries.

2. Background

Computer systems are increasingly being used to play back multimedia (audio and video) files. Current computer systems are often unable transfer data quickly enough from storage to allow adequate playback. To solve this problem, the multimedia data is compressed for transmission and decompressed for playback. However, some compression schemes are not suitable for environments where there is little processing power available.

Computers are often used to process, play back, and display video data. This video data may come from sources such as storage devices, on-line services, VCRs, cable systems, broadcast television tuners, etc. Video data is memory intensive, that is, video data requires large amounts of memory for storage and use by a computer system.

To reduce the transmission bandwidth and memory requirements when working with video data, various compression schemes have been developed so that less storage space is needed to store video information and a smaller bandwidth is needed to transmit it. Prior art video compression schemes include Motion JPEG, MPEG-1, MPEG-2, Indeo, Quicktime, True Motion-S, CinePak, etc.

Many prior art compression schemes rely on fast processing or powerful processors to decompress image or audio data. Many current systems exist where there is very little processing power available at the point of display. For example, a so called "thin" client that is part of a computer system may lack sophisticated processing power. A scheme is required that can compress and decompress data with little computational effort.

SUMMARY OF THE INVENTION

The present invention is a compression-scheme for compressing audio and video data. For image compression, an image is divided into blocks of pixels. The blocks may be 4×4 pixels, 5×5 pixels, 8×8 pixels, etc. A number of algorithms are used on each block to determine the best method of compressing that block of pixels. In one embodiment, the invention performs tests on the blocks. In one embodiment, the pixels of the block are compared to analogous pixels in a previous block. For example, the top left pixel of a block is compared to the top left pixel of the previous block and so on. If all of the pixels are approximately equal to the corresponding pixels in the previous block, then no data need be sent for that block, instead, the previous data can be used. In a second test, it is determined if all of the pixels in a block are approximately equal to a mean pixel value. If so, then only one color value need be transmitted for the block.

In a third test, it is determined if quantization of the pixels via companding result in an acceptable representation of the pixel values. If so, the quantization is used.

The present invention uses quantization (companding) codes that are proportional to the logarithm of the magnitude of the range quantized, computation of a magnitude byte that permits rapid discovery of the number of bits used for quantization of a block, recursive packing and unpacking of quantized pixel data, and two-dimensional paths (even 4 parallel paths) through the 4 by 4 or 8 by 8 block. In the case of image processing, the companding algorithm is initialized for each block using one byte of pixel data, which represents the unquantized representation of the initial pixel of the block. Quantization (companding) proceeds on a pixel-by-pixel basis for each pixel in the block. Thus there are only a finite number of pixels processed for a given block before the quantization algorithm is reset using the unquantized representation of the initial pixel of the next block. Because only a finite number of pixels is processed, there is a high probability that only a limited range of quantization codes will be used for a given block. Therefore, there is an excellent chance that the quantization codes for a given block will fit into one or two bits, not the maximum of four bits. This effect permits compression of the quantization codes via the recursive packing algorithm.

DETAILED DESCRIPTION OF THE INVENTION

A compression scheme for multimedia data is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

The present invention is directed to a compression scheme for multimedia data. In an embodiment that compresses video data, compression is applied to each video frame of the video data. Each frame consists of lines of pixels. The pixels are grouped into blocks of pixels. The pixels are then subjected to a series of tests to determine if a simple or less computationally intensive compression scheme can be applied to the block. The tests are simply the attempted application of increasingly more complex compression techniques. If a test is successful, that is, if the attempted compression results in adequate compression and acceptable quality, then no more testing is done and that compression scheme is applied to the block. If a test fails for lack of adequate. compression or quality, then the next test in sequence is attempted.

Figure 1:
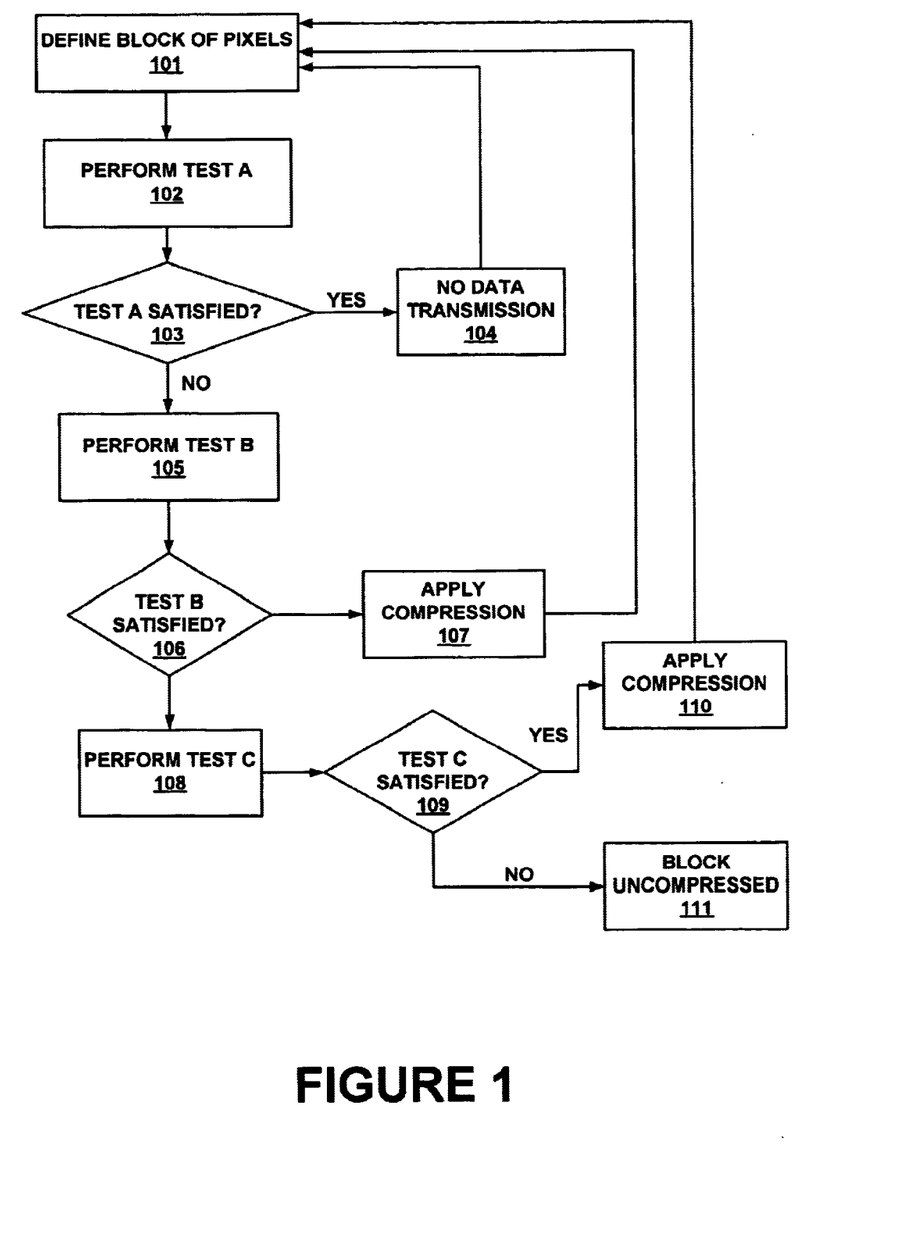
FIG. 1 is a flow diagram illustrating the operation of one embodiment of the present invention.

The tests are attempted until adequate compression and quality are accomplished, or until the last test has been reached. The invention has the advantage of reducing the computation required for compression and for achieving greater compression rates than single algorithm schemes without loss of quality. A flow diagram of the operation of the invention is illustrated in FIG. 1. At step 101 a block of pixels is defined. This block may be 4×4, 5×5, 8×8, or any other suitable block size. At step 102 a first test A is performed on the block. At decision block 103 it is determined whether the test is satisfied for compression and quality. If so, the system sends no data at step 104 and returns to step 101.

If the decision at block 103 is not satisfied, the system applies a second test B at step 105. At decision step 106 it is determined whether the test is satisfied for compression and quality. If so, that compression scheme is applied at step 107 and the system returns to step 101.

If the decision at step 106 is not satisfied, the system performs test C on the block at step 108. At decision block 109 it is determined if the test resulted in appropriate compression and quality. If so, the scheme is applied at step 110 and the system retrieves the next block at step 101. If not, the block is uncompressed (step 111).

Although the system of FIG. 1 shows the use of three tests for compression, the present invention can be used with any number of tests as appropriate. The number of tests used may impact the speed of compression and decompression. Where that is of concern, fewer tests may be used. However, the present invention contemplates an asymmetrical compression/decompression scheme, where compression might take longer than decompression.

In one embodiment of the invention, gamma corrected RGB color components for each pixel are transformed to obtain Y, Cb, and Cr components. Y, Cb, and Cr are compressed independently to produce compression data for the block of pixels. For each of Y, Cb, and Cr, the compression scheme produces six different compression codes that vary according to the block under consideration. Thus, for each pixel within a block, there are three outputs, each consisting of a compression code followed by a variable number of bytes of compressed data.

The compression codes of this embodiment of the present invention (applied to a 4×4 block of pixels) are as follows:

| Compression Code | Interpretation | Bytes |
|---|---|---|
| 0 | 0 bits per pixel | 0 |
| 1 | 1/2 bit per pixel | 1 |
| 2 | 1 bit per pixel | 3 |
| 3 | 2 bits per pixel | 5 |
| 4 | 4 bits per pixel | 9 |
| 5 | 8 bits per pixel | 16 |

The present invention combines the three compression codes into one "opcode" byte, followed by a variable number of bytes of compressed data for each of Y, Cb, and Cr.

The opcode byte is constructed by packing the three compression codes in radix-6 format. Letting $C_y$, $C_{Cb}$, and $C_{Cr}$ represent the compression codes for Y, Cb, and Cr respectively, the opcode byte O is constructed as:

$$O=6(6C_y+C_{Cb})+C_{Cr}$$

Test A

In one embodiment of the invention, test A determines whether each pixel in the block being tested is approximately equal to the corresponding pixel in a previous block. For purposes of this discussion, the block being tested is referred to as the "present block" and the block to which it is compared is referred to as a "previous block". The previous block may be a block in a previous frame (such as a block in the corresponding block position as the present block). Alternatively, the previous block may be a block in the same frame as the present block, such as the immediately preceding block.

In test A, a variance is calculated between the present block and the previous block. This previous variance may be calculated as:

$$V_p=\Sigma(p_i-b_i)^2$$

where $p_i$ represents the present pixel value and $b_i$ represents the previous pixel value.

If the previous variance $V_p$ falls below a threshold referred to as the "previous variance threshold", then the previous block of pixels is an adequate approximation of the present block of pixels and it can be substituted for the present block. This is very efficient encoding since no block data need be transmitted for the present block.

The present invention provides additional optimization in this embodiment. If all three color components (Y, Cb, Cr) pass the variance test A, there is an assumption that the block of data is probably part of an image background that does not change much between subsequent frames of the image sequence. It is also likely that this block of pixels is adjacent to other blocks of pixels that represent other relatively invariant parts of the image background. When this occurs, the invention initializes a counter to one, and for each subsequent, adjacent block for which all three colors pass the variance test, the counter is incremented by one. This creates a run length limited (RLL) optimization of test A.

Whereas use of the opcode byte permits each block to be represented by one byte, the RLL optimization permits the representation of many blocks by only two bytes, where the first byte specifies the run length encoding and the second byte represents the length of the run. If only the second byte were used to indicate run length, only 255 blocks could be included in a run. This limitation is overcome by using part of the opcode byte to encode the most significant bits of the run length value.

The opcode byte contains three compression codes encoded in radix-6 format. Because each compression code can assume a value of 0 through 5, the opcode byte assumes values of 0 through 215, leaving 40 unused values in the opcode byte. These unused values can be taken advantage of to encode the MSB's of the run length. Letting o represent the value of the opcode byte and c represent the value of the count byte, then the values may be obtained from the count value via:

o=(count>>8)+216 c=count-[(count>>8)<<8]

where >> represents the right shift operator and >>8 is equivalent to division by 256, and where << represents the left shift operator and <<8 is equivalent to multiplication by 256. When the opcode byte and the count byte have been calculated as above, then the count value may be obtained from these two bytes by:

count=[(o-216)<<8]+c

This approach allows the encoding of a run length of 10,239.

The first test of this embodiment of the present invention looks for blocks that are approximately identical, that is, their variance is within some threshold value. If a series of blocks have pixel values that vary slowly, each present block, when compared with a previous block, may satisfy the conditions of test A. However, when test A is satisfied, the same block is used again and again by the decoder. In some situations, that could lead to propagation of error. Consider where 100 consecutive blocks vary from each other by some small value. If test A is not satisfied for the first block, the pixel values of that block are transmitted. The first block now becomes the previous block and the next block becomes the present block. If a comparison of the present and previous blocks now satisfies test A, the result is to send no data, because the decoder can use the previously sent block (that is, the first block.) If this situation were to repeat for 100 blocks, the first block would be used by the decoder for all of the 100 blocks, even though after 100 repeats the difference in pixel values between the first block and the present block is 100 times the difference between any two consecutive blocks. In this situation, the decoder uses the first block for the present block even though the large difference between the two blocks does not satisfy the conditions of test A.

The problem can be eliminated by designating the most recently transmitted block as the previous block. With this approach, each present block is compared to the block actually transmitted (in the above example, the first block.) In this manner, gradual changes in pixel values will eventually exceed the threshold for test A and result in transmission of the present block (and correspondingly replace the previous block with the newly transmitted block.)

It should be noted that, in one embodiment of the invention, test A can include a check for exact equality of a pixel of one block and a corresponding pixel of another block. Exact equality is subsumed in the test for approximate equality, but the exact equality test has relatively low computational cost and can result in higher compression speeds, particularly for synthetic graphic images.

Figure 2:
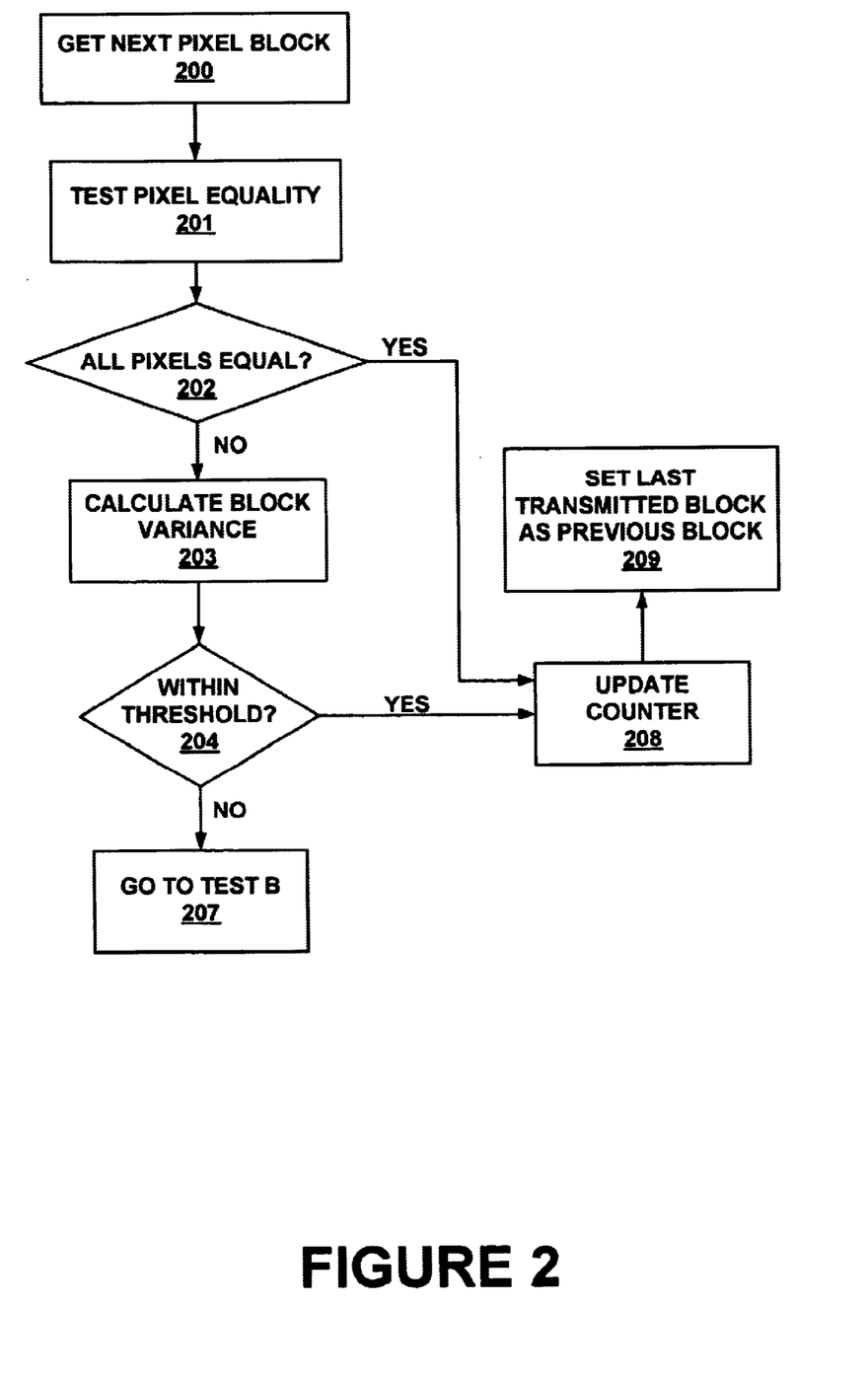
FIG. 2 is a flow diagram illustrating the operation of one embodiment of test A of the present invention.

FIG. 2 is a flow diagram of one embodiment of test A. At step 200, the pixel block to be examined is obtained. At step 201 the pixels are tested for equality with corresponding pixels of another block. At decision block 202, if all pixels are equal, compression code 0 is transmitted at step 208.

If the pixels are not equal at block 202 the block variance is calculated at step 203. At decision block 204 it is determined if the variance is within the desired threshold. If not, the system moves to test B at step 207.

If the variance threshold is met at step 204, compression code 0 is transmitted at step 208. At step 209, the last transmitted block is set as the previous block as the system returns to step 200.

Test B

If the block fails the first test, then a second type of comparison (test B) is applied. Test B is actually a two part test. First, test B determines whether all pixels within the block are equal to one another. If so, the compression algorithm outputs compression code 1, followed by one byte representing the constant value of the color component within the block.

If all of the pixels in the block are not equal, then the least-squares variance $v_{ls}$, is computed for the block to see if all of the pixels in the block are approximately equal to some mean value as follows:

where N is the number of pixels in the block and $p_i$ represents the pixel values. If the least-squares variance is less than a low-variance threshold, then the mean pixel value for the block is a reasonable approximation to the value of all pixels within the block. In this case, the algorithm outputs compression code 1, followed by one byte representing the mean pixel value for the block. Note that a positive least-squares variance test is the second instance where the compression algorithm outputs compression code 1 followed by one byte of data. The first instance was the case where all pixels were equal to one another within the block. The least-squares variance test is a more general test that subsumes the case where all pixels are equal. Thus, it is possible to eliminate the test for equality of pixels, and allow this condition to be detected as a least-squares variance of zero. However, the equality test has a low computational cost and could result in higher compression speeds for images with traditional amounts of single color backgrounds. This feature may, for example, be enabled when compressing synthetic images, as they are more likely to have regions of constant pixel values. The feature may be disabled when compressing video images, which may lack such uniform backgrounds.

Figure 3:
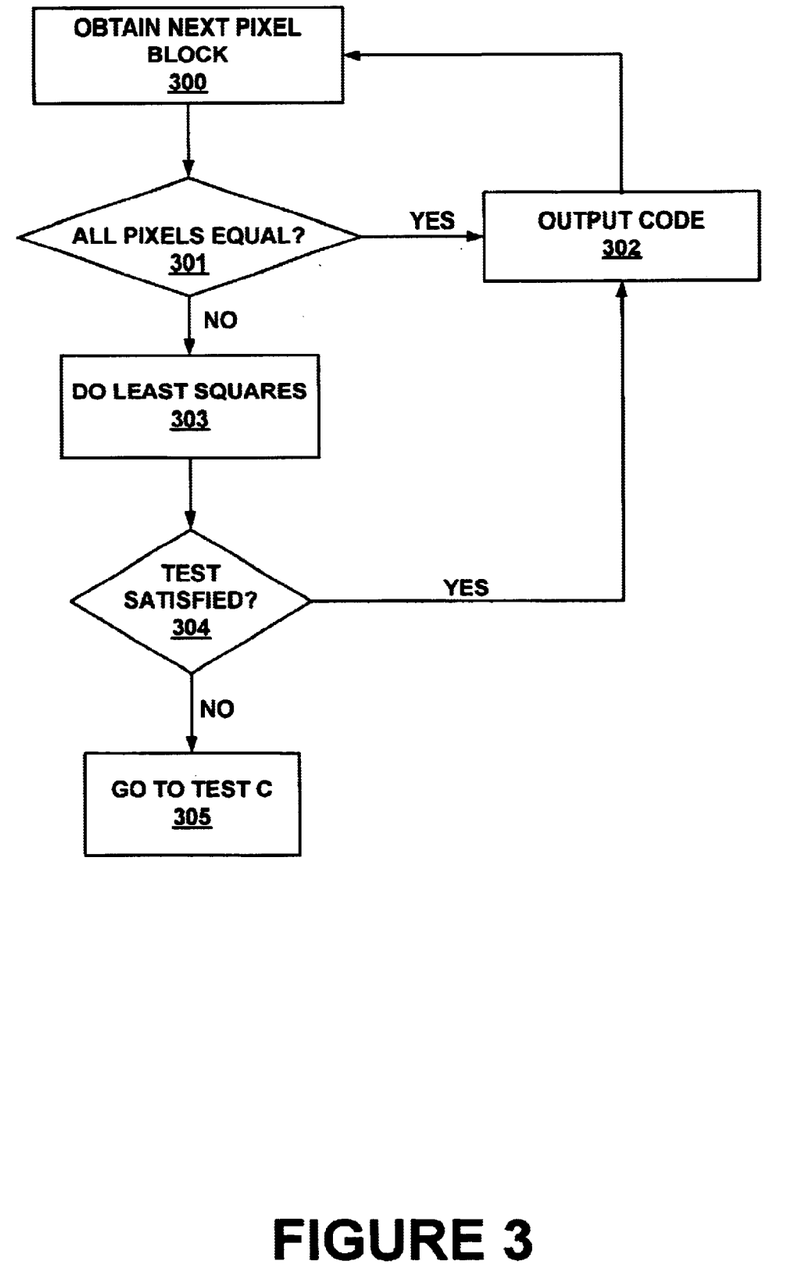
FIG. 3 is a flow diagram illustrating one embodiment of test B of the present invention.

FIG. 3 is a flow diagram illustrating one embodiment of test B. At step 300, the next pixel block to be examined is obtained. At step 301 an equality test is performed to see if all of the pixels in the block are equal. If so, compression code 1 is transmitted at step 302 and the system returns to step 300.

If all of the pixels are not equal then the least squares variance test is applied at step 303. If the variance test is satisfied at decision block 304, the system outputs compression code 1 at step 302 and returns to step 300. If the variance test is not satisfied, the system proceeds to test C at step 305.

Test C

If the least-squares variance is greater than the low-variance threshold, then the simple cases have been exhausted, and the pixels within the block are subjected to Test C. For each 8-bit pixel value, the quantizer produces a 4-bit quantization code that represents the quantized difference between the pixel value and the value of the previous pixel within the block. (Note that the definition of the previous pixel can mean a number of things).

Consider the following quantization algorithm:
for each block
    last$_{13}$ value=first$_{13}$ pixel
    for each pixel$_{13}$ value p in block
        diff=p−last$_{13}$ value
        q$_{13}$ value=quant[diff]
        last$_{13}$ value=clamp[last_value
            +d$_{13}$ quant[q_value]]
        emit q$_{13}$ value
    end
end The quantization algorithm is implemented using two table lookups. The quant[diff] operation is accomplished via a lookup table addressed by a 9-bit signed difference between successive pixel values. The clamp[last$_{13}$ value+ dquant[q$_{13}$ value]] operation is accomplished via a lookup table addressed by a 12-bit value that is obtained by catenating the 4-bit q$_{13}$ value with the 8-bit last$_{13}$ value.

An extension of the above quantization algorithm permits estimation of the coarseness of the quantization. As the quantizer creates the quantized values for a particular block, it creates the quantization variance $v_q$:

$$v_q = \Sigma (p_i - q_i)^2$$

where $p_i$ represent the original pixel values and $q_i$ represent the quantized pixel values. If the quantization variance exceeds a high-variance threshold, the quantization will introduce too much error into the pixel representation, and hence the quantized data must not be used. In this case, the compression algorithm outputs compression code 5, followed by 16 bytes representing the 16 unquantized pixel values for the 4×4 block (or 64 bytes for an 8×8 block.) Prior to comparison to the low- or high-variance thresholds, respectively, the least-squares variance and quantization variance can be normalized to the square of the mean pixel value for the block. The normalized variance expresses a constant ratio between the least-squares error and the mean pixel value for the block. Because the human visual system is sensitive to ratios of light intensity, this approach models the threshold test after the physiologic response of the human visual system.

Returning now to the discussion of quantization, if the quantization variance does not exceed the high-variance threshold, then the quantized pixel values will be output. However, often it is possible to output fewer than four bits per pixel of quantized data. In order to output fewer than four bits, it is necessary to define quantization codes such that there is a correlation between the number of bits used by a particular quantization code, and the magnitude of the difference that is quantized. Such a definition is:

| Difference | code |
|---|---|
| −255 to −91 | 14 |
| −90 to −71 | 12 |
| −70 to −51 | 10 |
| −50 to −31 | 8 |
| −30 to −16 | 6 |
| −15 to −8 | 4 |
| −7 to −3 | 2 |
| −2 to 0 | 0 |
| 1 to 2 | 1 |
| 3 to 7 | 3 |
| 8 to 15 | 5 |
| 16 to 30 | 7 |
| 31 to 50 | 9 |
| 51 to 70 | 11 |
| 71 to 90 | 13 |
| 91 to 255 | 15 |

This coding can be important, because for many blocks the interpixel variation is sufficiently small that any quantization code produced for these blocks may be represented using two bits, or even one bit.

A test of the number of bits required to represent any quantization code for a particular block may be implemented as follows. Prior to producing the quantization codes, the quantizer initializes a magnitude byte to zero. As the quantizer creates each quantization code, it inclusively ORs the code into this magnitude byte. When the quantizer has finished creating quantization codes for all pixels of the block, the magnitude byte contains a value that may be bit-tested to determine the maximum number of bits required to represent any quantization code for the block.

Once the number of bits required to represent any quantization code for the block is determined, the compression algorithm packs the quantization codes as two, four, or eight pixels per byte, corresponding to four, two or one bit per pixel, respectively. It is possible to pack the quantization codes as follows.

A 4×4 block contains 16 quantization codes. The quantizer places these 16 codes into an array of 16 unsigned characters, with each code occupying the four least-significant bits of a character. Using the union type available in C, it is possible to simultaneously represent the 16-element character array as an array of eight shorts, four integers, or two long longs:

```
typedef union block {
    unsigned char c[16];
    unsigned short s[8];
    unsigned int i[4];
    unsigned long long ll[2];
} Block;
```

Then with a variable b of type Block, it is possible to pack the quantization codes recursively into the two-, four- and eight-pixels-per-byte representations as follows:

$$b \rightarrow ll[0] = ((b \rightarrow ll[0]) << 4) | (b \rightarrow ll[1]);$$

$$b \rightarrow i[0] = ((b \rightarrow i[0]) << 2) | (b \rightarrow i[1]);$$

$$b \rightarrow s[0] = ((b \rightarrow s[0]) << 1) | (b \rightarrow s[1]);$$

The first of the above operations packs the codes as two pixels per byte, the second packs them as four pixels per byte, and the third packs them as eight pixels per byte. The worst case, where quantization codes are to be packed eight bits per pixel, requires only three shifts and three inclusive ORs per 4×4 block, making for an efficient scheme. This scheme may be adapted without difficulty to other block sizes, for example, and 8×8 block.

These recursive packing operations affect the ordering of the quantization codes within the 16-element array. If the codes were initially arranged in the following order in the array for a 4×4 block:

0 1 2 3 4 5 6 7 8 9 10 11 12 13 14 15 then the recursive packing operations shuffles the codes successively as the packing operation proceeds from four to two to one bit per pixel, as shown below:

0 8 1 9 2 10 3 11 4 12 5 13 6 14 7 15

0 4 8 12 15 9 13 26 10 14 37 11 15

0 2 4 6 8 10 12 14 1 3 5 7 9 11 13 15

This permutation of the order of the codes is acceptable, so long as the decoder unpacks the codes in the proper order.

For a 4×4 block, the four-, two- and one-bit-per-pixel representations require eight, four and two bytes, respectively. To these bytes is appended one additional byte which represents the unquantized value of the first pixel in the block. This byte provides an accurate starting point for the decoder at the beginning of each block. This approach makes the decoder less sensitive to bit errors that may arise due to transmission noise affecting the encoded image data. Additionally, this approach increases the probability that the quantized pixel data may be represented using less than four bits per pixel.

Depending upon which packing representation is used, the compression algorithm outputs a compression code (4, 3, or 2) followed by one byte representing the value of the first pixel of the block, followed by eight, four or two bytes of quantized pixel data (for a 4×4 block.)

Figure 7:
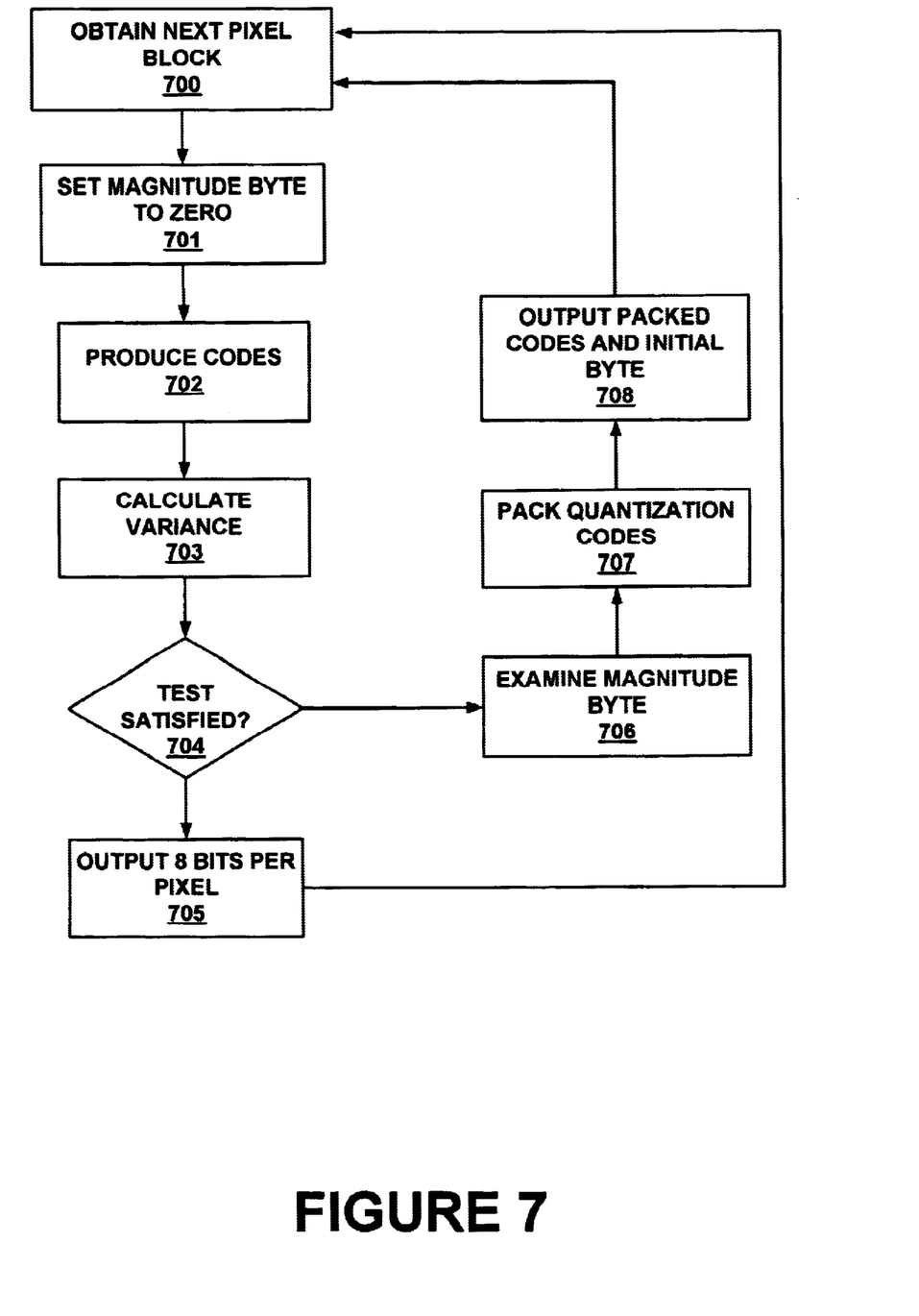
FIG. 7 is a flow diagram illustrating one embodiment of test C of the present invention.

FIG. 7 is a flow diagram illustrating one embodiment of test C. At step 700 the next pixel block to be examined is obtained. At step 701 the magnitude byte is initialized to zero. At step 702 the companding algorithm produces the 4-bit quantization codes. Also at this step, each quantization code is inclusively ORed into the magnitude byte. At step 703 the quantization variance $V_p$ is calculated from the original pixel values $p_i$ and the quantized pixel values $q_i$. Note that this step may be performed contemporaneously with step 702.

At step 704 the quantization variance is examined. If the quantization variance exceeds the high-variance threshold, then 8 bits per pixel are output in step 705, and control transfers back to step 700 to process the next block of pixels. If, however, the quantization variance does not exceed this threshold, then the 4-bit quantization codes will be packed and outputted. In step 706 the magnitude byte is examined to determine the number of bits required to represent the quantization codes (4, 2, or 1). In step 707 the quantization codes are packed via the recursive packing algorithm. In step 708, the 8 bit value of the initial pixel of the block is outputted, followed by the packed quantization codes. Control then transfers back to step 700 to process the next block of pixels.

Prior Pixel

The quantizer quantizes the difference between successive pixels. A block of pixels is two-dimensional. For this reason, the quantizer is directed to follow a path through the block, such as the path from point a to point b shown in FIG. 4 for a 4×4 block.

Figure 4:
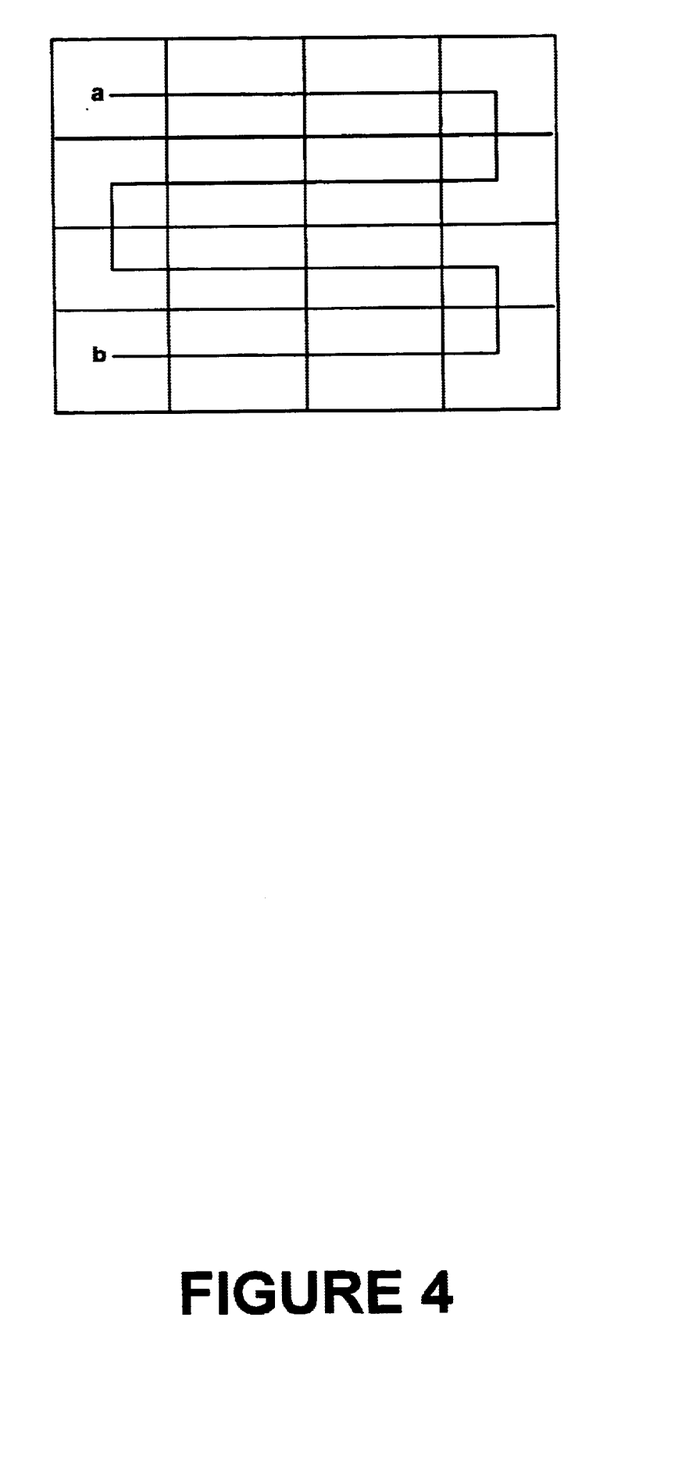
FIG. 4 is a diagram of the path taken by the compander through a block of pixels.

FIG. 4 shows the path taken by the compander as it proceeds on a pixel-by-pixel basis through a 4 by 4 block of pixels, beginning with pixel a (top left) and ending with pixel b (bottom left). The path is continuous with the compander going from left to right in the first row, moving to the rightmost pixel in the second row and going right to left, moving to the leftmost pixel of the third row and going left to right, and so on. The pixel data for pixel a is represented using an unquantized (i.e., 8-bit) representation. The pixel data for all other pixels is represented using the quantized (i.e., 4-bit) representation.

The path shown in FIG. 4 optimizes memory access for pixels stored in row order. Various alternative paths are possible. For example, in order to optimize quantizer performance for Sun's MAJC processor, four separate paths are taken through the four 4×4 blocks comprised by an 8×8 block. The MAJC processor quantizes pixels along these four paths in parallel using its four functional units.

Figure 5:
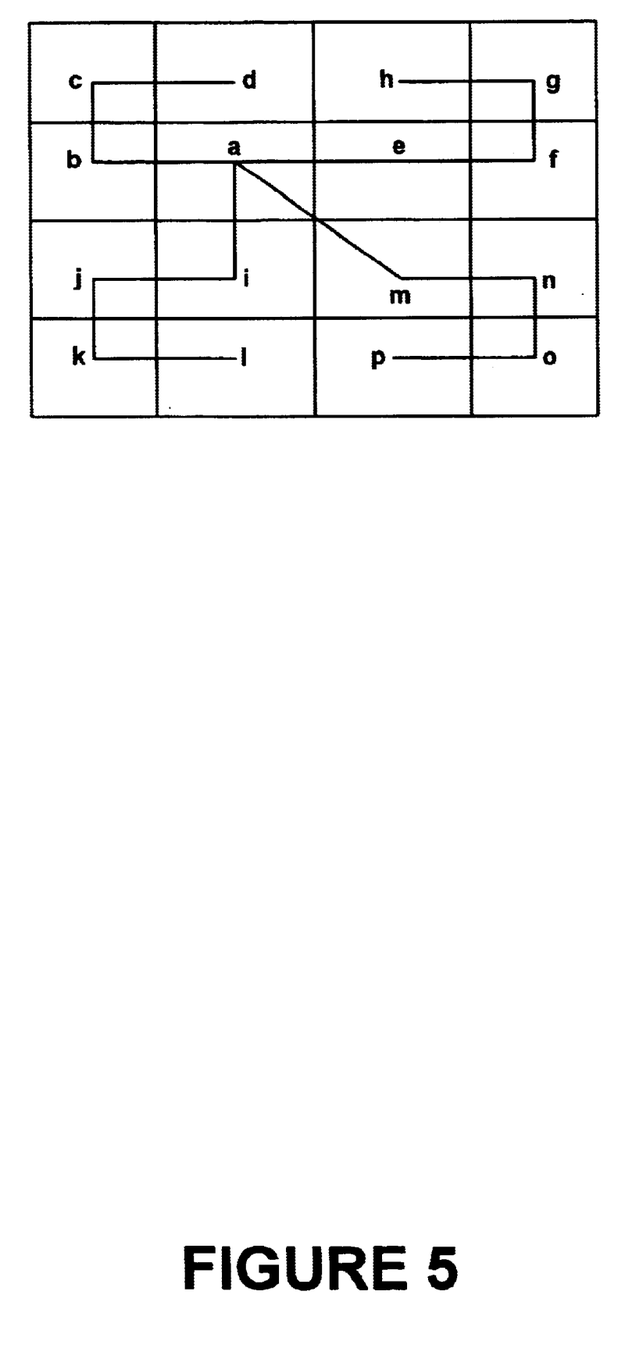
FIG. 5 illustrates alternate paths taken by the compander in the present invention.

FIG. 5 shows 4 different paths taken by the compander as it proceeds along four different paths through a 4 by 4 block of pixels. These four paths are taken so that more than one path may be processed simultaneously by a parallel processor such as Sun's MAJC processor. The four paths taken are: a,a,b,c,d; a,e,f,g,h; a,i,j,k,l; and a,m,n,o,p. Note that for the first of the four paths, the pixel a is listed twice. This is the case because the compander calculates the difference between successive pixels along a path. In the case of the first path, the differences are a–a, b–a, c–b and d–c. For the second path, the differences are e–a, f–e, g–f and h–g. For the third and fourth path, the differences are computed in an analogous manner. Thus for each path, four differences are calculated. Many different paths are possible. A necessary condition is that the decoder must know the path that the encoder has taken in order that the decoder be able to reconstruct the pixel values in order. It would be possible to traverse the block in pseudorandom order, and even in a different order for different blocks, so long as the decoder could traverse the block in the same order as the encoder. Note that any path through the block creates a two-dimensional traversal of the block.

Compander

Figure 6:
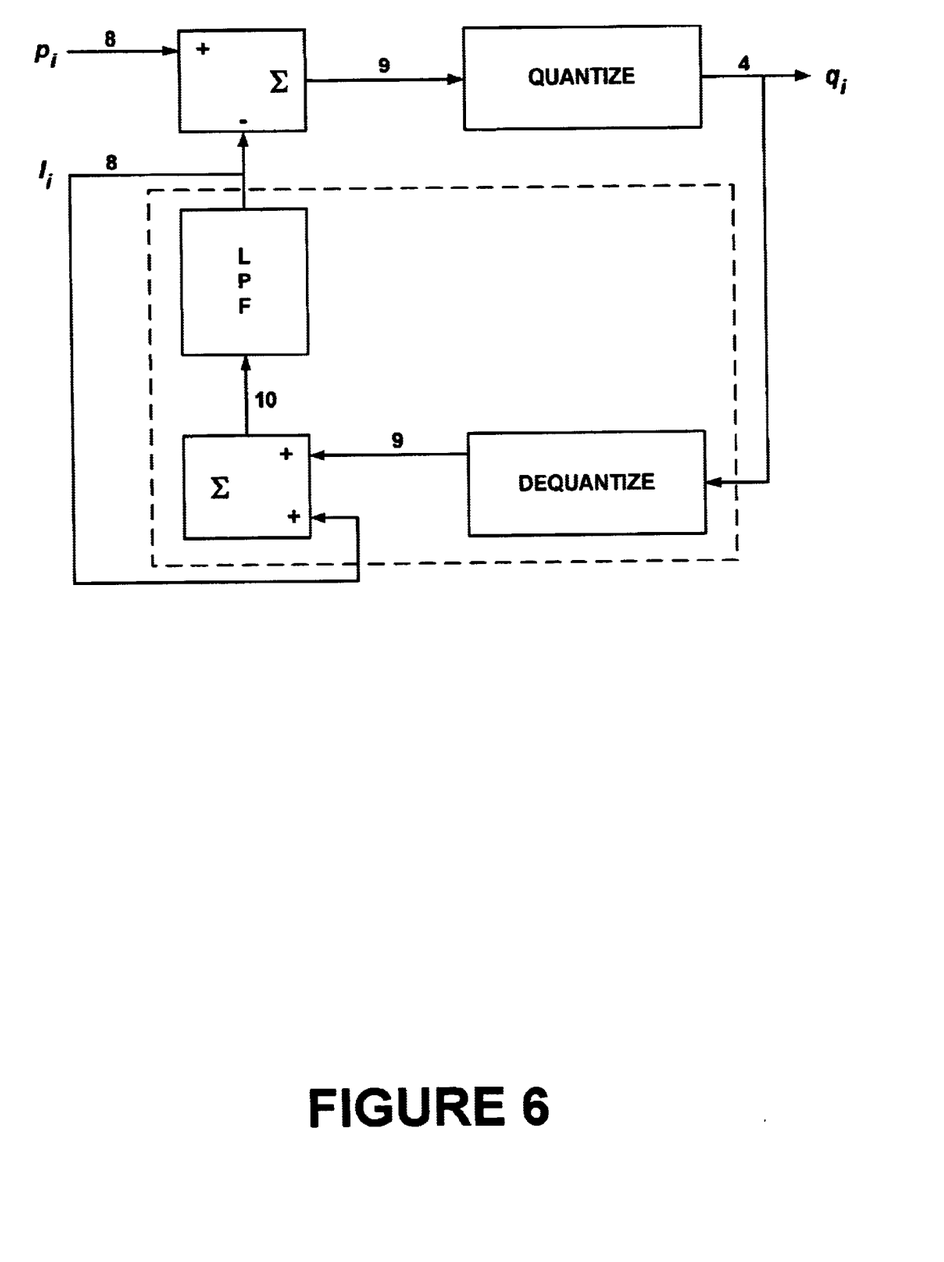
FIG. 6 is a block diagram of a compander.

FIG. 6 is a block diagram of a compander, which is one form of a differential pulse-code modulation (DPCM) coder. The diagram shows the quantizing operation of the encoder. In particular, the 8-bit value of the last pixel $l_i$ is subtracted from the 8-bit value of the present pixel pi to form a 9-bit value that is quantized to form the 4-bit quantized value $q_i$.

In order to update the value of the last pixel $l_i$, the encoder performs the same operations that are to be performed by the decoder. The dashed box encloses these operations. Specifically, the 4-bit quantized value $q_i$ is dequantized to obtain a 9-bit value. This 9-bit dequantized value is added to the 8-bit value of the last pixel $l_i$ to obtain a 10-bit value. This 10-bit value occurs because the 4-bit quantized value $q_i$ is not a fully accurate representation of the 8-bit pixel value $p_i$, and so the value obtained by addition of the 9-bit dequantized value to the 8-bit value of the last pixel $1_i$ may be less than 0 or greater than 255 (the allowed range for an 8-bit number.) Therefore, the 10-bit value is passed through a low-pass filter (LPF) which clamps it to the range of 0 to 255. The resulting 8-bit value becomes the updated value for $l_i$. These techniques are known in the prior art. An implementation of a compander in an alternate embodiment uses lookup tables to quantize and to perform the decoding function enclosed by the dashed box. The quantizing lookup table is accessed using a 9-bit address, and therefore contains $2^9$=512 entries. The decoding lookup table is accessed using a 12-bit address (created by catenating the 4-bit quantized value $q_i$ to the 8-bit value of the last pixel $l_i$), and therefore contains $2^{12}$=4096 entries.

Decompression Algorithm Operation

The decompression algorithm is designed to decode byte-aligned data as efficiently as possible. The first step of the decoding process is to decode the opcode byte O in order to determine how many bytes will follow for each of Y, Cb and Cr. Because the opcode byte O is encoded in radix-6 format, it is decoded to obtain the compression codes $C_y$, $C_{Cb}$ and $C_{Cr}$ as follows (see eq. 1):

$C_y$=O/36

$C_{Cb}$=(Omod36)/6

$C_{Cr}$=(Omod36)mod6

These decoding operations are implemented as table lookups where the tables are addressed by eight bits of O.

Once the compression codes have been obtained, the decompression algorithm constructs a block of pixels as directed by the compression codes described above. If the compression code is 0, no further decoding is necessary because the pixels have already been received as the previous block. The pixels are therefore copied from that block. If the compression code is 5, then the subsequent 16 bytes represent the 16 pixels of the 4×4 block (or 64 bytes for an 8×8 block.) If the compression code is 1, then the next byte is to be stored into all pixels of the block. This operation may be accomplished efficiently by taking advantage of the union type described above. Using a variable b of type Block, the byte of data is stored in b→c[0], then replicated to all other pixels of the block as follows:

$b{\rightarrow}c[1]{=}b{\rightarrow}c[0];$ $b{\rightarrow}s[1]{=}b{\rightarrow}s[0];$ $b{\rightarrow}i[1]{=}b{\rightarrow}i[0];$ $b{\rightarrow}ll[1]{=}b{\rightarrow}ll[0];$ If the compression code is 2, 3, or 4, then the next byte is the 8-bit representation of the first pixel of the block, and subsequent bytes represent the quantization codes packed as one, two or four bits per pixel, respectively. Because the packing operation has shuffled the quantization codes and permuted their order, the unpacking operation must restore the original order.

The following sequence of operations accomplishes unpacking in the correct order. It utilizes a variable b of type Block. The operations recursively unpack the data from one bit per pixel to two bits per pixel, from two bits per pixel to four bits per pixel, and from four bits per pixel to eight bits per pixel, thus placing each (unpacked) 4-bit quantization code into the four least-significant bits of an 8-bit byte:

$$b \rightarrow s[1] = (b \rightarrow s[0]) \ \& \ 0x5555;$$

$$b \rightarrow s[0] = ((b \rightarrow s[0]) >> 1) \ \& \ 0x5555$$

$$b \rightarrow i[1] = (b \rightarrow i[0]) \ \& \ 0x33333333;$$

$$b \rightarrow i[0] = ((b \rightarrow i[0]) >> 2) \ \& \ 0x33333333;$$

$$b \rightarrow ll[1] = (b \rightarrow ll[0]) \ \& \ 0x0f0f0f0f0f0f0f0f;$$

$$b \rightarrow ll[0] = ((b \rightarrow ll[0]) >> 4) \ \& 0x0f0f0f0f0f0f0f0f;$$

Once the quantized codes have been unpacked, they may be used to recover quantized pixel data. This operation can be implemented as a table lookup as below:

for each block
    $last_{13}$ value=$first_{13}$ pixel
    for each quantization-value $q_{13}$ value in block
        $last_{13}$ value=clamp[$last_{13}$ value
            +dquant[$q_{13}$ value]]
        emit $last_{13}$ value
    end
end The clamp[$last_{13}$ value+dquant[$q_{13}$ value]] operation is accomplished via a lookup table addressed by a 12-bit value that is obtained by catenating the 4-bit $q_{13}$ value with the 8-bit $last_{13}$ value.

Sound Compression

The present invention may apply equally well to sound compression. At regular intervals, the sound companding algorithm is re-set using the unquantized representation of a sound sample, in a manner analogous to the way in which the initial pixel for a block is represented in an unquantized manner. If the quantization codes are chosen to be proportional to the logarithm of the magnitude of the sound quantized, then the probability is high that, between any two unquantized representations of sound samples, the quantized representations would fit into less than the maximum number of quantized bits. In this case, the quantized representations could be further compressed via the recursive packing algorithm.

I claim:

1. A method for data compression comprising:

defining a block of pixels as a present block;

comparing a characteristic of each pixel of said present block to a corresponding pixel of a previous block;

transmitting no data when each of said pixels of said present block is approximately equal to said corresponding pixels of said previous block;

comparing a characteristic of each of said pixels of said present block to all other pixels of said present block when each of said pixels is not approximately equal to said corresponding pixels of said previous block;

transmitting one byte of data when each of said pixels of said present block is approximately equal to all other pixels of said previous block;

quantizing each of said pixels to a quantized value of said present block when each of said pixels of said present block is not approximately equal to all other pixels of said present block;

transmitting said quantized value when said quantized value is within a predetermined quantization variance.

2. The method of claim 1 wherein said characteristic comprises a color value.

3. A method for data compression comprising:

defining a present block as one or more first pixels;

defining a previous block as one or more second pixels;

transmitting no data if a first test is successful;

applying a first compression scheme if said first test is not successful and if a second test is successful;

applying a second compression scheme if said first and second tests are not successful and if a third test is successful; and not compressing said present block if said first, second, and third tests are not successful.

4. The method of claim 3 wherein each of said first and second pixels have characteristics and said first test comprises:

testing said first and second pixels using said characteristics;

transmitting no data when said characteristics of said first pixels are equal to said characteristics of said second pixels; and transmitting no data when each of said characteristics of said first pixels are approximately equal to said characteristics of said second pixels.

5. The method of claim 4 wherein said step of transmitting no data when said characteristics of said first pixels are approximately equal further comprises:

calculating a previous variance from said characteristics of said first and second pixels; and transmitting no data when said previous variance falls below a variance threshold value.

6. The method of claim 5 wherein said characteristics comprise color values.

7. The method of claim 3 wherein each of said first pixels have characteristics and wherein said second test comprises:

comparing said characteristics of each of said first pixels;

applying said first compression scheme when all of said characteristics are equal; and applying said first compression scheme when all of said characteristics are approximately equal.

8. The method of claim 7 wherein said step of applying said first compression scheme when all of said characteristics are approximately equal comprises:

testing a least squares variance equation for said characteristics of said first pixels; and applying said first compression scheme when said characteristics of said first pixels are approximately equal to a least squares variance mean value.

9. The method of claim 8 wherein said characteristics comprise color values.

10. The method of claim 3 wherein each of said first pixels have characteristics and wherein said third test comprises:

testing each of said first pixels by comparing said characteristics of each of said first pixels;

comparing a member of said first pixels to another member of said first pixels using said characteristics;

applying no compression to said present block when a difference between said characteristics of said member and said another member exceeds a threshold value; and applying said second compression scheme to said present block when said difference between said characteristics of said member and said another member is within said threshold value.

11. The method of claim 10 further comprising:

representing said difference between said characteristics of each of said member and said another member wherein said difference equals a quantized difference.

12. The method of claim 11 wherein said another member is selected by following a two-dimensional path from said member in said present block.

13. The method of claim 12 wherein said two-dimensional path comprises one or more of horizontal, vertical, and diagonal movements from said member to said another member.

14. The method of claim 12 wherein said characteristics comprise color values.

* * * * *